US012177663B2

(12) United States Patent
Srivastava et al.

(10) Patent No.: US 12,177,663 B2
(45) Date of Patent: Dec. 24, 2024

(54) SELECTIVE NETWORK SLICE AUTHENTICATION AND AUTHORIZATION IN A MOBILE NETWORK ENVIRONMENT (71) Applicant: Cisco Technology, Inc., San Jose, CA (US)

(72) Inventors: Vimal Srivastava, Karnataka (IN); Sri Gundavelli, San Jose, CA (US); Ravi Kiran Guntupalli, Cumming, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 276 days.

(21) Appl. No.: 17/752,182

(22) Filed: May 24, 2022

(65) Prior Publication Data
US 2023/0388792 A1    Nov. 30, 2023

(51) Int. Cl.
H04W 12/06    (2021.01)
H04W 60/00    (2009.01)
H04W 84/04    (2009.01)

(52) U.S. Cl.
CPC ........... *H04W 12/06* (2013.01); *H04W 60/00* (2013.01); *H04W 84/042* (2013.01)

(58) Field of Classification Search
CPC .... H04W 12/06; H04W 60/00; H04W 84/042
See application file for complete search history.

(56) References Cited

U.S. PATENT DOCUMENTS

| 11,683,682 | B2 * | 6/2023 | Faccin | H04W 12/06 370/328 |
| 2020/0267554 | A1 * | 8/2020 | Faccin | H04L 63/101 |
| 2022/0007184 | A1 | 1/2022 | Ferdi et al. | |
| 2022/0132311 | A1 * | 4/2022 | Zhu | H04W 12/06 |

(Continued)

FOREIGN PATENT DOCUMENTS

| CN | 113573297 A | * | 10/2021 | |
| WO | WO-2021000283 A1 | * | 1/2021 | ......... H04L 63/0892 |

(Continued)

OTHER PUBLICATIONS

3GPP, "Addressing ENs in security procedures for network slices," 3GPP TSG-SA3 Meeting #98Bis-e, S3-200658, Change Request, 33.501, Current Version 16.2.0, Apr. 2020, 10 pages.—Supplied by Applicant (Year: 2020).*

3GPP, "Addressing ENs in security procedures for network slices," 3GPP TSG-SA3 Meeting #98Bis-e, S3-200658, Change Request, 33.501, Current Version 16.2.0, Apr. 2020, 10 pages.

3GPP, "3rd Generation Partnership Project; Technical Specification Group Services and System Aspects; Security architecture and procedures for 5G system (Release 16)," 3GPP TS 33.501, V16.10.0, Technical Specification, Mar. 2022, 287 pages.

(Continued)

*Primary Examiner* — Richard G Keehn
(74) *Attorney, Agent, or Firm* — Edell, Shapiro & Finnan, LLC (57) ABSTRACT

Presented herein are techniques to provide selective network slice authentication and authorization in a mobile network environment. In one example, a method may include obtaining, by an access management element of a mobile network, a registration request from a user equipment, wherein the registration request identifies a plurality of network slices with which the user equipment seeks authentication; determining that if authentication for the user equipment with a first network slice is successful, authentication for the user equipment with one or more other network slices can be skipped; and upon successful authentication for the user equipment with the first network slice, skipping authentication for the user equipment with the one or more other network slices.

20 Claims, 7 Drawing Sheets

(56) References Cited

U.S. PATENT DOCUMENTS

| | | | | |
|---|---|---|---|---|
| 2022/0174487 A1* | 6/2022 | Thakolsri | | H04W 8/20 |
| 2022/0312307 A1* | 9/2022 | Koshta | | H04W 60/04 |
| 2023/0067830 A1* | 3/2023 | Tiwari | | H04W 12/06 |
| 2023/0085363 A1* | 3/2023 | Kim | | H04W 76/18 |
| | | | | 455/411 |
| 2023/0121491 A1* | 4/2023 | Long | | H04W 36/0038 |
| | | | | 455/411 |
| 2023/0171598 A1* | 6/2023 | Normann | | H04W 8/18 |
| | | | | 455/410 |
| 2023/0189187 A1* | 6/2023 | Velev | | H04W 48/20 |
| | | | | 455/435.1 |
| 2023/0276237 A1* | 8/2023 | Foti | | H04W 76/34 |
| | | | | 455/411 |
| 2023/0397092 A1* | 12/2023 | Kim | | H04W 48/02 |
| 2024/0048986 A1* | 2/2024 | Liu | | H04W 76/12 |

FOREIGN PATENT DOCUMENTS

| | | | | |
|---|---|---|---|---|
| WO | 2021/098104 A1 | | 5/2021 | |
| WO | WO-2021180170 A1 * | | 9/2021 | ............ H04W 12/00 |
| WO | WO-2021204065 A1 * | | 10/2021 | |
| WO | WO-2021247725 A1 * | | 12/2021 | ............ H04W 12/06 |

OTHER PUBLICATIONS

3GPP, "3rd Generation Partnership Project; Technical Specification Group Services and System Aspects; Procedures for the 5G System (5GS); Stage 2 (Release 17)," 3GPP TS 23.502, V17.4.0, Technical Specification, Mar. 2022, 738 pages.

3GPP, "3rd Generation Partnership Project; Technical Specification Group Services and System Aspects; Procedures for the 5G System (5GS); Stage 2 (Release 16)," 3GPP TS 23.502, V16.12.0, Technical Specification, Mar. 2022, 615 pages.

3GPP, "3rd Generation Partnership Project; Technical Specification Group Services and System Aspects; System architecture for the 5G System (5GS); Stage 2 (Release 17)," 3GPP TS 23.501, V17.4.0, Technical Specification, Mar. 2022, 567 pages.

3GPP, "3rd Generation Partnership Project; Technical Specification Group Services and System Aspects; System architecture for the 5G System (5GS); Stage 2 (Release 16)," 3GPP TS 23.501, V16.12.0, Technical Specification, Mar. 2022, 454 pages.

Techplayon, "5G NG Identities (UE and Network Identifiers)," https://www.techplayon.com/5g-nr-identifier/, Sep. 20, 2017, 7 pages.

Arkko, et al., "Improved Extensible Authentication Protocol Method for 3GPP Mobile Network Authentication and Key Agreement (EAP-AKA')," Internet Engineering Task Force (IETF), RFC 9048, Oct. 2021, 40 pages.

Arkko, et al., "Improved Extensible Authentication Protocol Method for 3rd Generation Authentication and Key Agreement (EAP-AKA')," IETF, Network Working Group, Request for Comments: 5448, May 2009, 29 pages.

Arkko, et al., "Extensible Authentication Protocol Method for 3rd Generation Authentication and Key Agreement (EAP-AKA)," The Internet Society, Network Working Group, Request for Comments: 4187, Jan. 2006, 79 pages.

3GPP, "3rd Generation Partnership Project; Technical Specification Group Services and System Aspects; Security architecture and procedures for 5G system (Release 17)," 3GPP TS 33.501, V17.5.0, Technical Specification, Mar. 2022, 293 pages.

* cited by examiner

SELECTIVE NETWORK SLICE AUTHENTICATION AND AUTHORIZATION IN A MOBILE NETWORK ENVIRONMENT

TECHNICAL FIELD

The present disclosure relates to network equipment and services.

BACKGROUND

Networking architectures have grown increasingly complex in communications environments, particularly mobile networking environments. In particular, network slicing is a networking concept that has been introduced for Third Generation Partnership Project (3GPP) mobile networks, such as 3GPP Fifth Generation (5G) mobile networks. With the introducing of network slicing architectures, there are significant challenges in managing network communications and connectivity for mobile network devices.

DESCRIPTION OF EXAMPLE EMBODIMENTS

Overview

Presented herein are techniques to provide selective network slice authentication and authorization in a mobile network environment, which can be utilized to reduce signaling between a user equipment and a mobile core network, such as a Third Generation Partnership Project (3GPP) Fifth Generation (5G) mobile network, Sixth Generation (6G) mobile network, or the like, which may result in an efficient use of radio resources and/or may reduce core network signaling.

In one embodiment, a method is provided that may include obtaining, by an access management element of a mobile network, a registration request from a user equipment, wherein the registration request identifies a plurality of network slices with which the user equipment seeks authentication; determining that if authentication for the user equipment with a first network slice is successful, authentication for the user equipment with one or more other network slices can be skipped; and upon successful authentication for the user equipment with the first network slice, skipping authentication for the user equipment with the one or more other network slices.

Example Embodiments

Network slicing is a key concept in the Third Generation Partnership Project (3GPP) Fifth Generation (5G) System (5GS) architecture. A network slice is a logical end-to-end network that can be dynamically created and may include any combination of 3GPP mobile core network functions/functionality. Generally, a network slice, also referred to generally as a 'slice', 'instantiated slice', or 'slice instance', can refer to a group or set of Virtualized Network Functions (VNFs) that are configured to facilitate a certain mobile network service or group of mobile network services.

A given UE may have access to multiple network slices over a Radio Access Network (RAN). Each network slice may serve a particular service type with an agreed upon Service-level Agreement (SLA). To provide mobile network services associated with a given slice type, a slice of the given network slice type can be instantiated in which the instantiated slice for the slice type can provide certain mobile network services to a number of UEs.

A network slice instance within a Public Land Mobile Network (PLMN) can include any combination of Next Generation (NG) RAN and/or core network control plane and user plane network functions.

Per-3GPP Technical Specification (TS) 23.501, Section 5.15.2, Single-Network Slice Selection Assistance Information (S-NSSAI) can be used to uniquely identify a slice in which an S-NSSAI includes a Slice/Service Type (SST) indication, which indicates the expected slice behavior for a slice requested by a UE in terms of expected features and services, and, optionally, can include a Slice Differentiator (SD), which can be used to differentiate among multiple slices of a same SST.

Different types of slices (slice types) can be configured for a mobile network such that each slice type can provide certain mobile network services. As referred to herein and in the claims, the terms 'slice', 'slice instance' and/or variations thereof may be used interchangeably to refer to a type of slice that is instantiated (e.g., configured, created, validated, operated, managed, etc.) within a mobile core network to provide one or more mobile network services for one or more user equipment. Various VNFs that can be configured for a slice type in accordance with techniques described herein can include any combination of 3GPP Fourth Generation/Long Term Evolution (4G/LTE) VNFs, 5G VNFs, 6G VNFs, etc., as may be prescribed, at least in part, by 3GPP standards.

Various example slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

For various examples herein, a network slice requested by a UE can be referenced generally as a number or value, formatted as "S-NSSAI: #" in various examples herein, in which the number (#) can correspond to an SST value and, optionally, an SD, in accordance with 3GPP specifications.

Thus, as referred to herein, the terms "network slice," "slice," "S-NSSAI," and any variations thereof can be used interchangeably. It is to be understood that any SST values may be configured by a mobile network operator for other slice types. Additionally, slice type values used for various examples/embodiments described herein may differ from standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

Enterprise entities (e.g., businesses, corporations, government entities, educational/university entities, etc.) typically prefer to have an additional layer of security for enterprise wireless devices (also typically referred to as "user equipment" (UE)) authenticating to specific network slices; such security measures have been provided in 3GPP standards, at a basic level, since Release 16 of 3GPP standards. Currently under 3GPP standards, such as 3GPP TS 23.502, Version 16.12.0, published March 2022, if a UE indicates its support for a Network Slice-Specific Authentication and Authorization (NSSAA) procedure via a UE Mobility Management (MM) Core Network Capability in a Registration Request, and any S-NSSAI of a Home Public Land Mobile Network (HPLMN) with which the UE seeks connectivity is subject to Network Slice-Specific Authentication and Authorization, an NSSAA authorization procedure is executed, as prescribed at least by Section 4.2.9.1, via signaling between the UE, and an Access and Mobility Management Function (AMF), an NSSAA Function (NSSAAF), and an Authentication, Authorization, and Accounting (AAA) function/server within the mobile core network.

Currently under 3GPP standards, the NSSAA procedure is performed/completed for all network slices/S-NSSAIs with which a UE seeks registration. Upon completion of the NSSAA for all the network slices/S-NSSAIs, the AMF can trigger a UE Configuration Update procedure to deliver an indication of all the allowed network slices/S-NSSAIs for which the NSSAA procedure was successful and can also provide an indication of any S-NSSAIs for which the NSSAA procedure was unsuccessful using an appropriate rejection cause value.

According to the current standards-based implementation of the NSSAA procedure, the authentication/authorization procedure is performed separately for every network slice/S-NSSAI that is subject to the NSSAA procedure. Consider FIGS. 1A and 1B, which are a message sequence diagram illustrating a call flow 100 associated with NSSAA procedures as currently defined by 3GPP standards. For example, FIGS. 1A and 1B include a UE 101, an AMF 102, an NSSAAF 103, an AAA server 104, and a Unified Data Management (UDM) 105 entity.

Figure 1A:
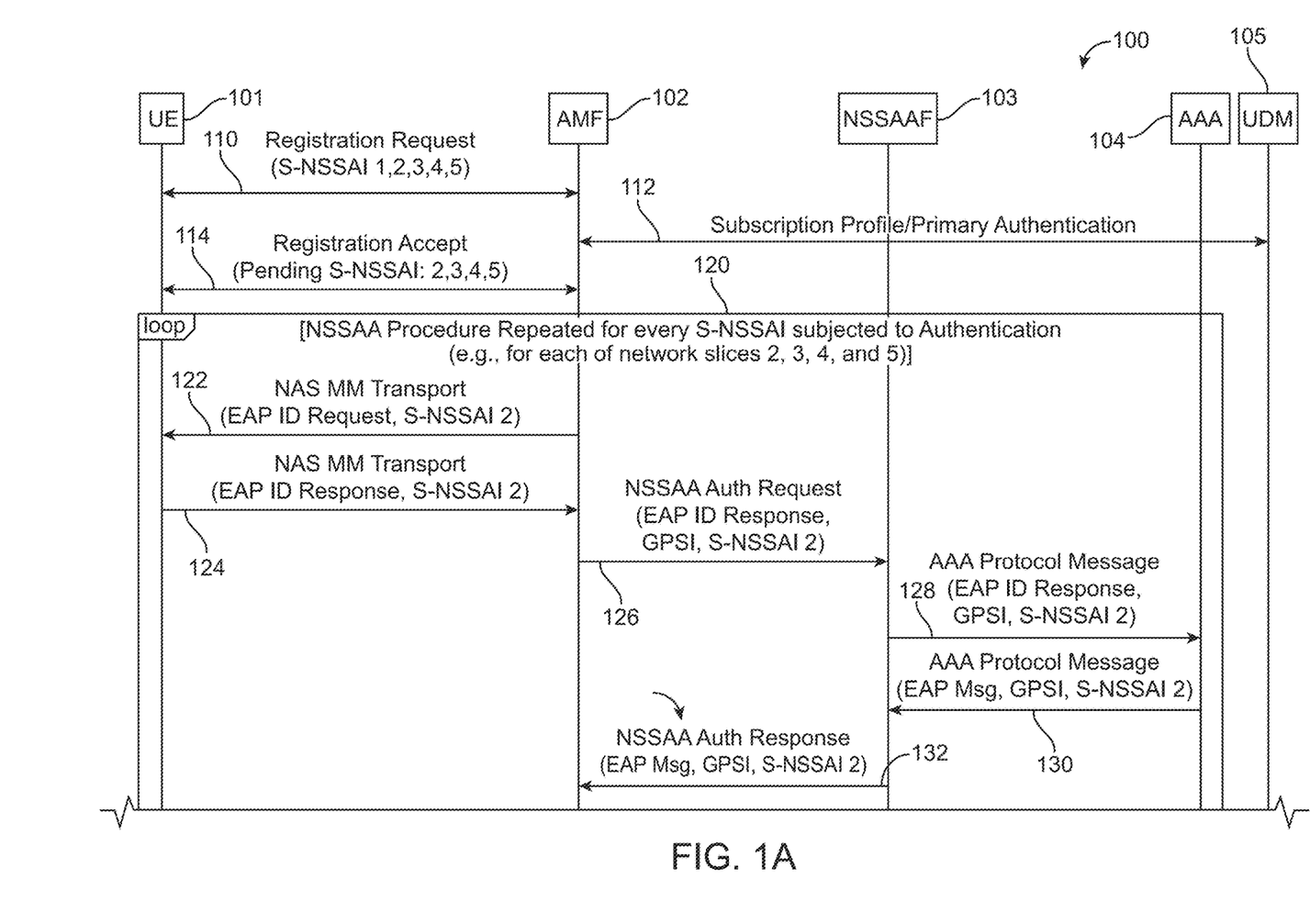
FIGS. 1A and 1B are a message sequence diagram illustrating a call flow associated with network slice authentication and authorization procedures as defined by Third Generation Partnership Project (3 GPP) standards.

As illustrated in FIG. 1A, consider at 110 that the UE 101 sends a registration request to AMF 102 that identifies network slices, S-NSSAI 1, 2, 3, 4, and 5. At 112, AMF 102 performs an exchange with UDM 105 to obtain a subscription profile for UE 101 and perform a primary authentication for UE 101 for mobile core network connectivity. Through the exchange, AMF 102 can determine that S-NSSAIs 2, 3, 4, and 5 are subject to the standards-based NSSAA procedures to authenticate/authorize the UE to connect to each network slice and inform the UE 101, via a registration accept message at 114 that S-NSSAIs 2, 3, 4, and 5 (note, the network slice 1 is not considered to be subject to the NSSAA procedure for the example of FIGS. 1A and 1B).

Figure 1B:
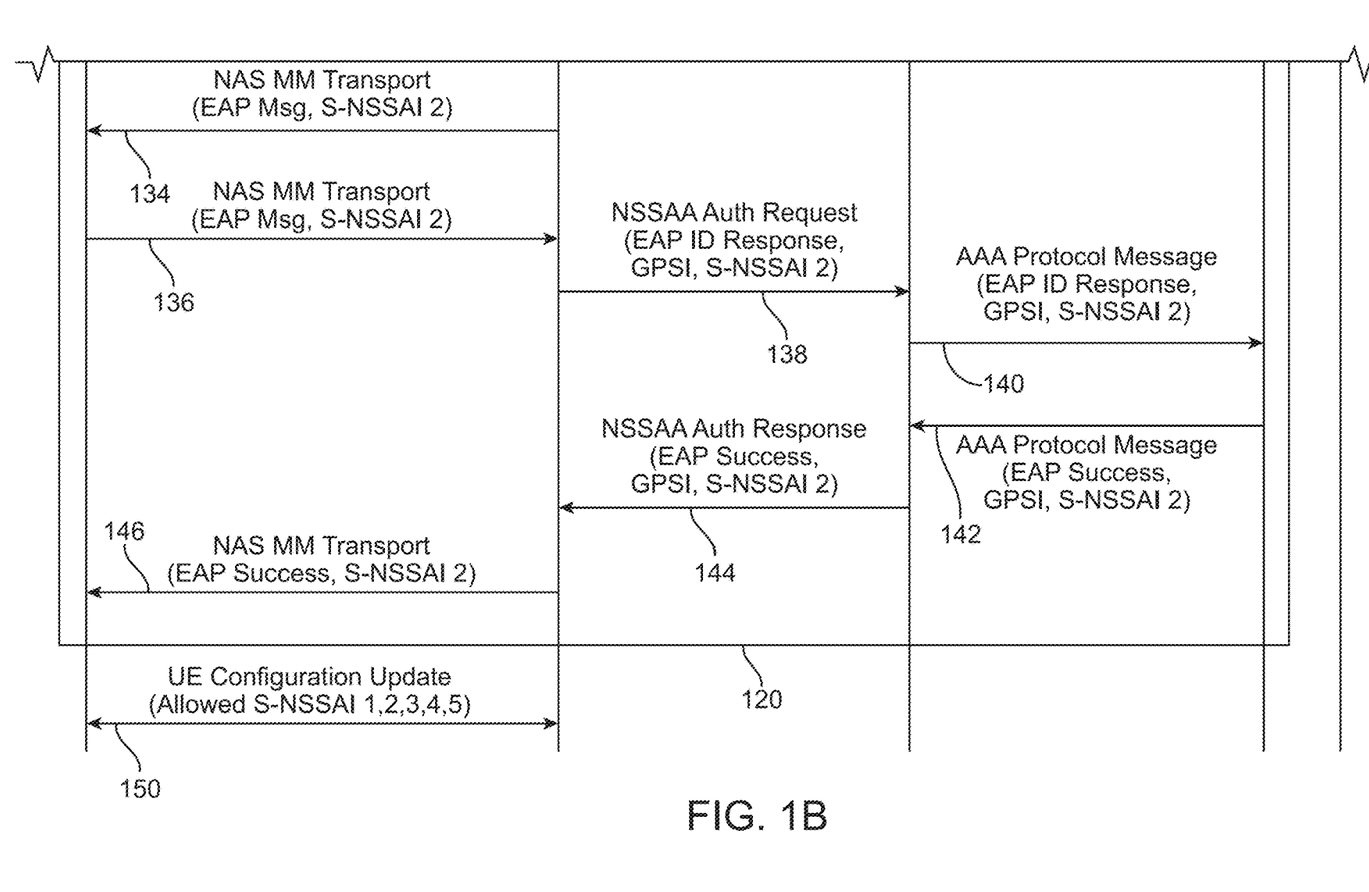

Thus, under a standards-based NSSAA implementation, as shown at 120, an NSSAA procedure is repeated for every S-NSSAI that is subject to NSSAA authentication/authorization such as, in this example, for each of network slices 2, 3, 4, and 5 (recall, network slice 1 is not considered to be subject to the NSSAA procedure for the example of FIGS. 1A and 1B). For each NSSAA procedure that is performed for each network slice, the standards-based NSSAA procedure generally involves the AMF 102 requesting an EAP identity (ID) for UE 101, as shown at 122 (e.g., for S-NSSAI 2, etc.) via a Non-Access Stratum (NAS) Mobility Management (MM) transport communication, to which the UE 101 responds to the AMF 102 with its EAP ID, as shown at 124. Thereafter, the AMF 102 initiates an authentication for the UE 101 towards the AAA server 104 by sending the EAP identity response to the NSSAAF 103, as shown at 126, using a Generic Public Subscription Identifier (GPSI) for the UE 101. The NSSAAF 103 forwards the EAP identity response to the AAA server 104, as shown at 128. The AAA server 104 stores the GPSI to create an association with the EAP ID for an EAP ID response message, which is to be received later in the procedure.

Thereafter at 130, 132, 134 (FIG. 1B), 136, 138, 140, 142, 144, and 146, a standards-based EAP exchange is performed via AAA server 104, NSSAAF 103, AMF 102, and UE 101, as prescribed at least by 3GPP TS 33.501, Section 16, and Internet Engineering Task Force (IETF) Request For Comments (RFC) 4187, 5448, and 9048, in order to successfully authenticate the UE for a given S-NSSAI, such as S-NSSAI 2, as shown in FIGS. 1A and 1B. Under the standards based NSSAA implementation shown in FIGS. 1A and 1B, the NSSAA procedure is looped through for each of S-NSSAI 2, 3, 4, and 5 (recall, the NSSAA procedure is not performed for S-NSSAI 1 since it is not subject to the NSSAA procedure for this example. Thereafter, after successful completion of the NSSAA procedure for each of network slices/S-NSSAIs 2, 3, 4, and 5, a standards-based UE Configuration Update procedure is performed between AMF 102 and UE 101, as shown at 150, in which the AMF 102 informs UE 101 of each network slice with which UE 101 is allowed/authorized to establish a Protocol Data Unit (PDU) session such as, in this example, with each of network slices/S-NSSAIs 1, 2, 3, 4, and 5.

Under the standards based NSSAA procedure, performing the NSSAA procedure for every network slice requested by a UE that is subject to the NSSAA procedure can result in an excessive amount of signaling between core network functions and a UE, which can consume both network resources and radio access network resources.

In order to address such issues, techniques are provided herein that can be utilized within a mobile core network environment in order to facilitate a selective NSSAA procedure such that a configuration can be provided for a UDM and/or an AMF within a mobile core network that includes network slice mapping information indicating that if authentication for a given slice is successful, then authentication for other slices (identified, mapped, or otherwise correlated to the given slice) can be skipped, which can reduce the signaling involved for slice authentication when multiple subscribed network slices are enabled for/subject to authentication using NSSAA. Further, such techniques can be used to enable additional security for enterprise use cases without having a signaling burden and/or configuration burden on an enterprise entity. For example, enterprises may not deploy many slices. However, in such enterprise scenarios, say, for example that a UE may be authorized for IoT and URRLC slices such that access to URLLC may also imply access to IOT slice, which may provide for an optimization with respect to signaling to be realized for such enterprise environments that may decrease load on network elements and authentication/authorization functions.

For example, in one instance, a network slice configuration mapping may be provided in a mobile core network (e.g., for an AMF and/or UDM in a 5G core network (5GC)) in which, using the example above, S-NSSAI 2 can be mapped to S-NSSAI 3 and 4, which can be used to indicate that upon a successful authentication for a given UE with S-NSSAI 2, authentications for S-NSSAI 3 and S-NSSAI 4 can be skipped, such that the UE is considered to be authenticated for S-NSSAI 3 and S-NSSAI 4 merely by completing a successful authentication with regard to 5-NSSAI 2. Similarly, under such a mapping, a successful authentication of S-NSSAI 4 would mean that authentications for S-NSSAI 2 and S-NSSAI 3 could be skipped, or a successful authentication of S-NSSAI 3 would mean that authentications for S-NSSAI 2 and S-NSSAI 4 could be skipped. In another instance using the above example, S-NSSAI 5 may not be mapped to any other network slices, which could be used to indicate that no other S-NSSAI authentications may be skipped upon successful authentication of S-NSSAI 5. Other variations can be envisioned, such as configuring network slice groups through which successful authentication for a particular S-NSSAI belonging to one or more particular network slice group(s) can be used to infer that authentication for all other network slices belonging to the particular network slice group(s) can be skipped, as discussed in further detail herein, below.

Figure 2:
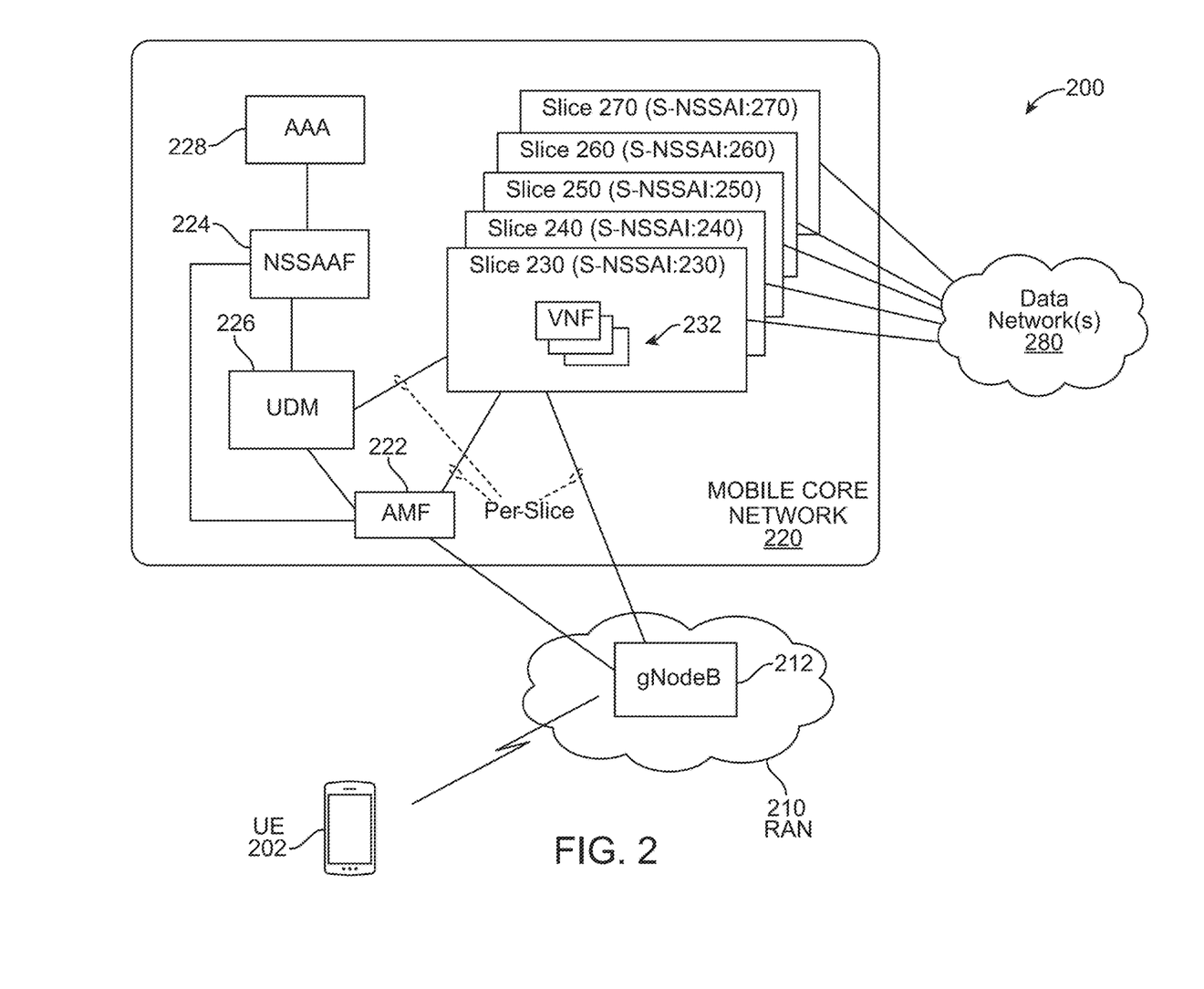
FIG. 2 is a block diagram of a system in which techniques may be implemented to provide selective network slice authentication and authorization in a mobile network environment, according to an example embodiment.

Referring to FIG. 2, FIG. 2 is a block diagram of a system 200 in which techniques may be implemented to provide selective network slice admission control in a mobile network environment, according to an example embodiment. As shown in FIG. 2, system 200 may include a UE 202, a Radio Access Network (RAN) 210, a mobile core network 220, and one or more data networks 280. RAN 210 may be implemented as a 3GPP 5G/next generation (nG) RAN and may include at least one gNodeB 212 (sometimes referred to as a 'gNB').

In at least one embodiment, mobile core network 220 may be representative of a 5G core (5GC) network or 5GS and may include an Access and Mobility Management Function (AMF) 222, Network Slice-Specific Authentication and Authorization Function (NSSAAF) 224, a Unified Data Management (UDM) entity 226 (referred to herein as UDM 226), and an Authentication, Authorization, and Accounting (AAA) server/function (referred to herein as AAA 228). UDM 226 may interface with or include a Unified Data Repository (UDR), not shown in FIG. 2.

Mobile core network 220 may also include a number of network slices that have been instantiated for corresponding slice types provided by mobile core network 220 for various services (e.g., general services, mIoT services, URLLC services, eMBB services, V2X services, etc.) that may be provided for one or more PDU sessions for UE 202 (or any other UE that may be present in mobile core network 220). For example, mobile core network 220 may include a network slice 230, a network slice 240, a network slice 250, a network slice 260, and a network slice 270 in which each slice may be configured to provide services for each of a corresponding slice type and may be identified by a corresponding S-NSSAI. Each network slice may include any number/combination of Virtualized Network Functions (VNFs) (labeled as VNF 232 of network slice 230, for example) in order to perform corresponding services associated with each network slice.

In various embodiments, VNFs configured for a given network slice can include any combination of one or more Session Management Functions (SMFs), User Plane Functions (UPFs), a Policy Control Functions (PCF), a UDM, a Network Repository Function (NRF), Network Slice Selection Functions (NSSF), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications for any Third Generation (3G)/Fourth Generation (4G)/5G/6G/next Generation (nG) network slice implementation(s).

As referred to herein, network slice 230 may be referred to interchangeably herein as 'S-NSSAI: 230', network slice 240 may be referred to interchangeably herein as 'S-NSSAI: 240', network slice 250 may be referred to interchangeably herein as 'S-NSSAI: 250', network slice 260 may be referred to interchangeably herein as 'S-NSSAI: 260', and network slice 270 may be referred to interchangeably herein as 'S-NSSAI: 270'.

In various embodiments, the data network(s) 280 of FIG. 2 may include be any combination of the Internet, a gaming network, an Internet Protocol (IP) Multimedia Subsystem (IMS), an Ethernet data network (not shown), Ethernet switching system(s) (not shown), and/or the like.

RAN 210, via gNodeB 212, may interface with mobile core network 220 via one or more wired and/or wireless interfaces. For example, gNodeB 212 may interface with AMF 222. The gNodeB 212 may also interface with one or more VNFs (e.g., UPFs) of each of network slices 230, 240, 250, 260, and 270. RAN 210, via gNodeB 212, may also interface with UE 202 via one or more over-the-air Radio Frequency (RF) connections.

Regarding mobile core network 220, AMF 122 may further interface with NSSAAF 224 UDM 226. AMF 222 may also interface with one or more VNFs (e.g., SMFs, PCFs, UDMs, etc.) of each network slice 230, 240, 250, 260, and 270. UDM 226 may also interface with one or more VNFs (e.g., SMFs, etc.) of each network slice 230, 240, 250, 260, and 270. NSSAAF may also interface with AAA 228. The various interfaces shown in FIG. 2 are provided for illustrative purposes only and are not meant to limit the broad scope of the present disclosure. It is to be understood that network connectivity/interfaces among any of UE 202, RAN 210, mobile core network 220 and data network(s) 260, and any VNFs/elements/logic associated therewith, may be provided in any manner/configuration in accordance with 3GPP standards to facilitate operations as discussed for embodiments herein.

Generally, RAN 210 may include any combination of one or more 3GPP 5G/nG gNodeB or gNB, such as gNodeB 212 and/or 3GPP 4G/LTE evolved node Bs (eNodeBs or eNBs), not shown, to facilitate network connectivity between UE 202 and mobile core network 220. A gNodeB/eNodeB, such as gNodeB 212, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for RAN 210 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more UE, such as UE 202, may utilize to connect to RAN 210 for one or more sessions (e.g., voice, video, data, gaming, combinations thereof, etc.) with a mobile core network, such as mobile core network 220.

A UE, such as UE 202, may be associated with any (enterprise) user, subscriber, employee, client, customer, electronic device, etc. wishing to initiate a flow in system 200 and may be inclusive of any device that initiates a communication in system 200, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 200. Thus, a UE may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, such as gNodeB 212 of RAN 210, for one or more sessions with a mobile core network, such as mobile core network 220.

In addition to various operations discussed for techniques herein, an AMF, such as of AMF 222, may facilitate access and mobility management control/services for one or more UE, such as UE 202, for connection of UE 202 with one or more of network slice(s) 230, 240, 250, 260, and/or 270 of mobile core network 220. Typically, a UDM, such as the UDM 226 (or any other UDM discussed herein) stores subscription data for subscribers (e.g., a user associated with UE 202) that can be retrieved and/or otherwise obtained/utilized during operation of system 200.

NSSAAF 224 operates to facilitate per network slice authentication and authorization operations in coordination with AAA 228, as may be prescribed by 3GPP standards (e.g., 3GPP TS 23.501, 23.502, etc.), for any network slices/S-NSSAIs that are to be subject to NSSAA procedures for mobile core network 220.

Consider various operational details for providing selective network slice authentication and authorization in accordance with techniques herein with further reference to FIGS. 3A and 3B, discussed below. For example, FIGS. 3A and 3B are a message sequence diagram illustrating a call flow 300 associated with providing selective network slice authentication and authorization in a mobile network environment, according to an example embodiment.

Figure 3A:
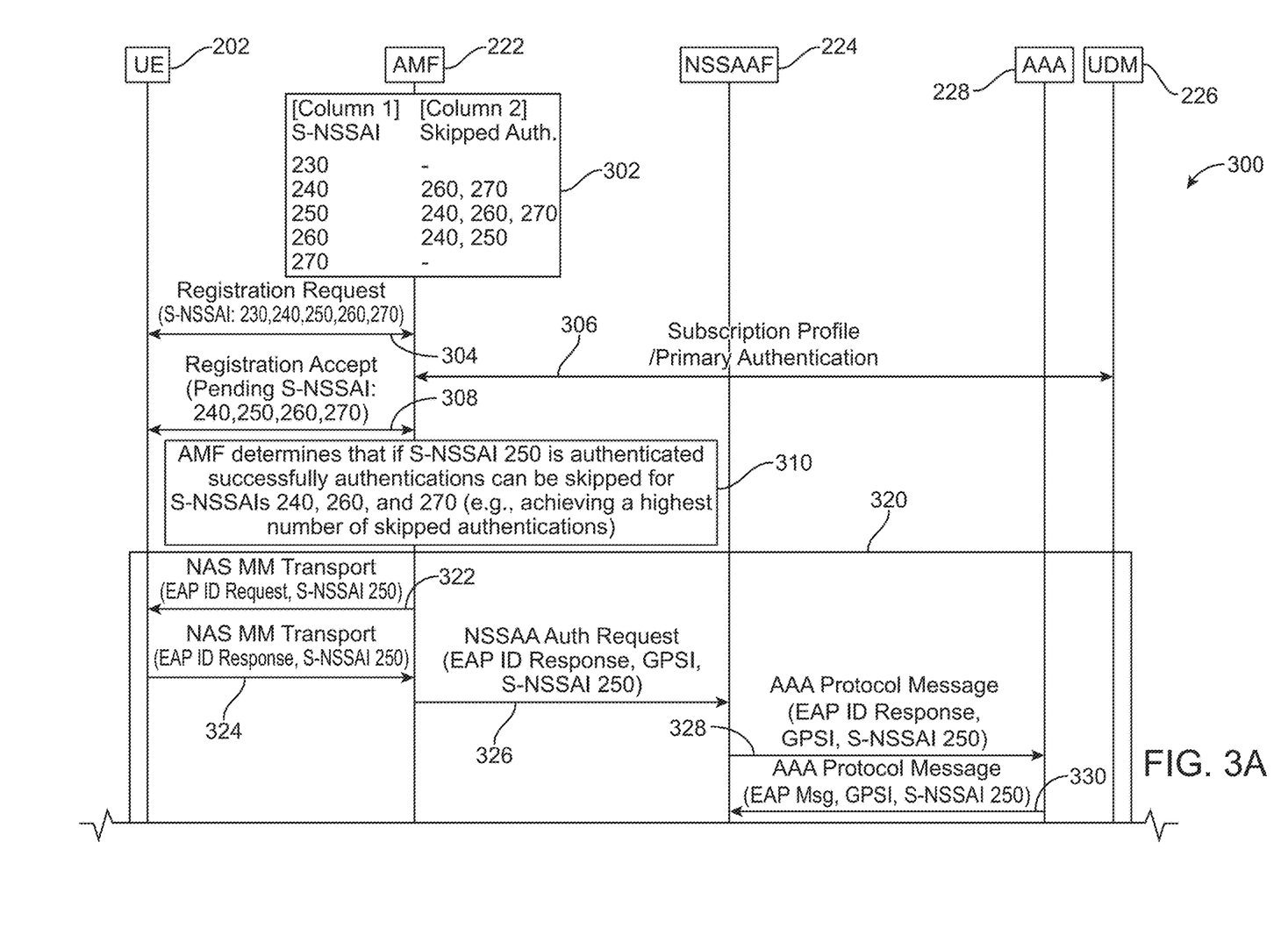
FIGS. 3A and 3B are a message sequence diagram illustrating a call flow associated with providing selective network slice authentication and authorization in a mobile network environment, according to an example embodiment.
Figure 3B:
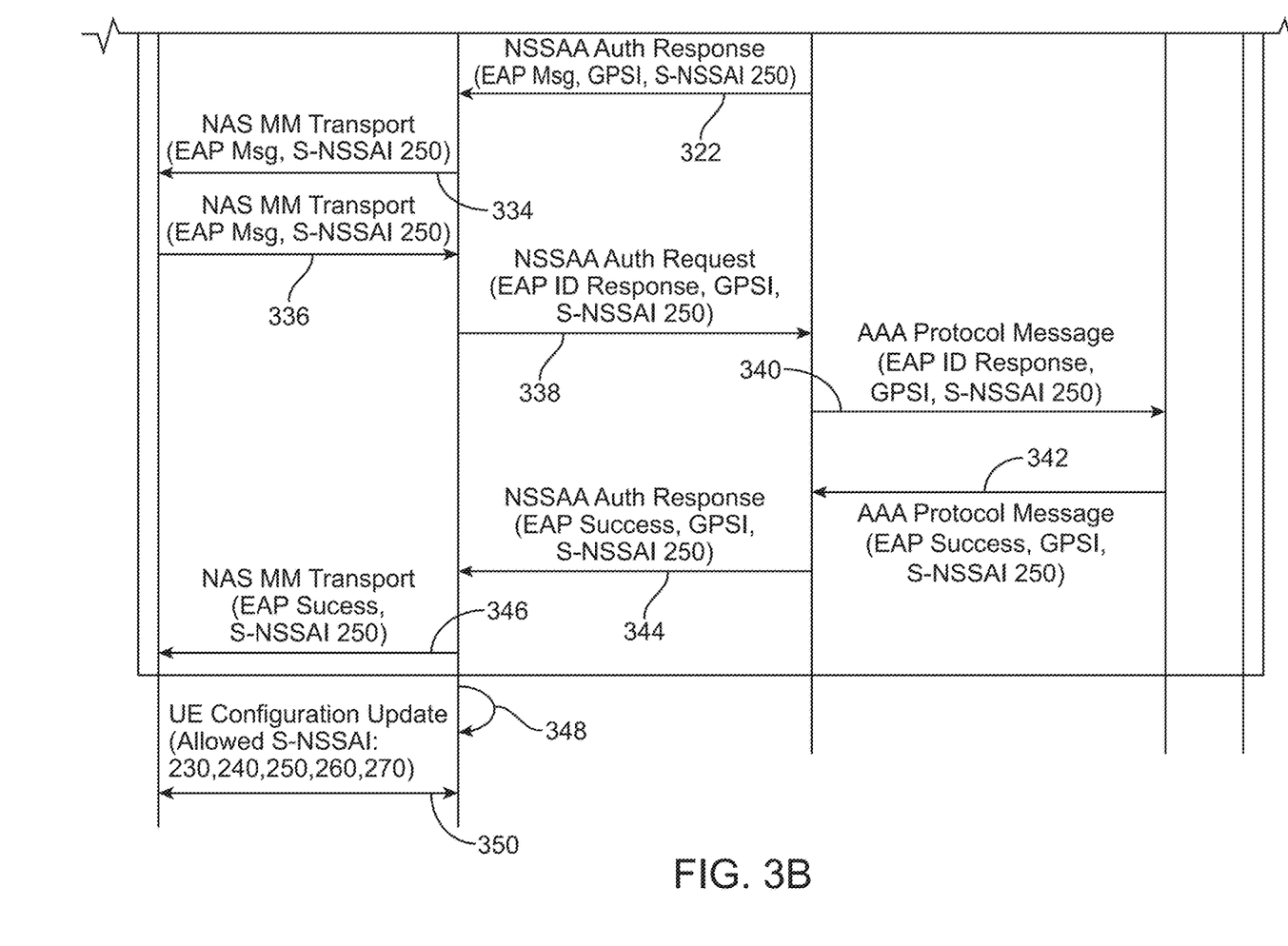

Consider for the example operational flows that FIGS. 3A-3B include UE 202, AMF 222, NSSAAF 224, UDM 226, and AAA 228. Although not shown in FIGS. 3A-3B, it is assumed that UE 202 interacts/communicates with various network elements of mobile core network 220 via RAN 210/gNodeB 212, as shown in FIG. 2. For the embodiment of FIGS. 3A-3B, consider that network slice/S-NSSAI 230 is not subject to NSSAA authentication/authorization procedures.

Consider in at least one embodiment that AMF 222 is configured with network slice mapping policies/information 302 that identifies each of a given network slice/S-NSSAI in a first column and, in a second column, identifies whether, upon successful authentication of a given network slice/S-NSSAI in the first column, any corresponding networks slices/S-NSSAIs for which authentication can be skipped.

For example, for the network slice mapping policies/information 302 configured for AMF 222, the mapping indicates that upon successful authentication for a given UE (e.g., UE 202) with network slice 270, that no authentications can be skipped for any other network slices. However, upon successful authentication for a given UE with network slice 240, the UE can be considered authenticated for network slices 260 and 270, such that the authentications for the UE with network slices 260 and 270 can be skipped. Further, upon successful authentication for a given UE with network slice 250, the UE can be considered authenticated for network slices 240, 260, 270, such that the authentications for the UE with network slices 240, 260, and 270 can be skipped. Further, upon successful authentication for a given UE with network slice 260, the UE can be considered authenticated for network slices 240 and 250, such that the authentications for the UE with network slices 240 and 250 can be skipped. Since network slice/S-NSSAI 230 is not subject to NSSAA authentication/authorization procedures, no network slice mapping policy/information is configured for network slice/S-NSSAI 230.

Although the example of FIGS. 3A and 3B illustrate the network slice mapping policies/information 302 being configured for AMF 222, in some embodiments network slice mapping policies/information can be configured for UDM 226 and can be obtained by AMF 222 from the UDM 226 through an exchange between the AMF 222 and UDM 226 to obtain the subscription profile for UE 202 and perform a primary authentication for the UE 202.

It is to be understood that the network slice mapping policies/information 302 illustrated in FIG. 3A is only one example configuration that could be utilized to facilitate selective network slice authentication and authorization procedures in accordance with embodiments herein. For example, in one embodiment network slice mapping policies/information could be configured such that network slice groups could be defined, each having a corresponding group identifier (ID), in which one or more network slices could be mapped into each group ID. In such an embodiment, for a corresponding group ID, any network slice identified within the corresponding group ID that has been successfully authenticated for a given UE may automatically indicate that every other network slice identified within the group ID is also considered to be authenticated for the given UE. Consider other example network slice mapping policies/information that may be configured within a mobile core network (e.g., via an AMF and/or UDM/UDR. as configured below in TABLE 1, for example.

TABLE 1

Group-based Network Slice Mapping Policies

| Group ID | Network Slices in Group |
|---|---|
| 20 | 1, 3, 5 |
| 30 | 1, 2, 4 |
| 50 | 1 |
| 40 | 7, 8, 5 |

For the example group-based network slice mapping policies illustrated in TABLE 1, consider, for example, an instance in which network slice 1 is successfully authenticated. As shown in TABLE 1, network slice 1 is included in group IDs 20, 30 and 50; thus, if network slice 1 is successfully authenticated for a given UE in this example, then network slices 2, 3, 4, and 5 could also be considered authenticated for the given UE and the NSSAA procedure for network slices 2, 3, 4, and 5. However, network slices 7 and 8 would still need to be authenticated for the given UE per this example. In another instance, if network slice 5 is authenticated for a given UE, then other network slices identified in group IDs 20 and 40 (network slices 1, 3, 7, and 8, in this example) are considered to be authenticated for the given UE. In yet another instance, if network slice 7 is authenticated for a given UE, then only the other network slices identified in group ID 40 (network slices 8 and 5) are considered authenticated, such that authentication for the given UE with respect to the identified network slices can be skipped. Other variations for network slice mapping policies/information that may be configured for a mobile core network can be envisioned.

Returning to the present example illustrated in FIGS. 3A and 3B, consider at 304 that the UE 202 sends a registration request to AMF 222 that identifies that UE 202 seeks (via transmission of a Registration Request message) to register with network slices/S-NSSAIs 230, 240, 250, 260, and 270. At 306, AMF 222 performs an exchange with UDM 226 to obtain a subscription profile for UE 202 and perform a primary authentication for UE 202 for mobile core network 220 connectivity. Through the exchange, AMF 220 can determine that network slices/S-NSSAIs 240, 250, 260, and 270 are subject to NSSAA procedures to authenticate/ authorize the UE 202 to connect to each network slice. Recall, for the example of FIGS. 3A and 3B that network slice/S-NSSAI is not subject to NSSAA procedures. Thus, at 308, AMF 222 provides UE 202 (via a Registration Accept message) indication that authentication/authorization of UE 202 is pending with regard to network slices/S-NSSAIs 240, 250, 260, 270 (as network slice/S-NSSAI 230 is not subject to the NSSAA procedures in this example, UE 202 is considered authenticated/authorized to establish a PDU session with network slice/S-NSSAI 230 following successful completion of the primary authentication of UE 202).

At 310, AMF 222 determines, based on the network slice mapping policies/information 302, that if UE 202 is successfully authenticated for network slice/S-NSSAI 250, that UE 202 is considered to also be authenticated for network slices/S-NSSAIs 240, 260, and 270. Thus, the AMF determines at 310 that if the NSSAA procedure is successfully performed for UE 202 with network slice/S-NSSAI 250, that the NSSAA procedure could be skipped for UE 202 with regard to network slices/S-NSSAIs 240, 260, and 270 based on the network slice mapping policies/information.

In one embodiment, an AMF, such as AMF 222, can determine an optimal network slice for performing an NSSAA procedure using network slice mapping policies/ information (configured for the AMF and/or obtained by the AMF from a UDM/UDR) by analyzing the policies/information to determine a network slice/S-NSSAI that could result in the most or highest number of other network slices/S-NSSAIs being skipped for authentication upon successful authentication of a given network slice/S-NSSAI. For instance, for the example of FIGS. 3A-3B, the network slice mapping policies/information indicate that successful authentication of UE 202 with network slice 250 could result in skipping the NSSAA procedure for three additional network slices (240, 260, and 270), whereas successful authentication of UE 202 with network slice 240 could result in skipping the NSSAA procedure for only two additional network slices (260 and 270) and successful authentication of UE 202 with network slice 260 could also only result in skipping the NSSAA procedure for two network slices (240 and 250). Thus, for this example, successful authentication of UE 202 with network slice 250 could result in achieving a highest number of skipped authentications/NSSAA procedures of other network slices as compared to network slice policies/information configured/stored for the other network slices/S-NSSAIs 240 and 260.

Other logic for determining one or more network slices for performing NSSAA procedures; in order to reduce the number of overall NSSAA procedures for a given UE can be envisioned. For example, in one instance, similar logic as discussed above could be performed on a network slice group ID basis by determining a particular network slice group ID having a particular network slice that is identified among a highest number of other group IDs and performing an NSSAA procedure for the particular network slice in order to skip NSSAA procedures for other network slices. In still another example, an AMF could simply work through network slice mapping policies/information in a sequential order (e.g., starting with performing an NSSAA procedure for network slice 240, then proceeding to performing an NSSAA procedure for network slice 250) until an authentication/authorization determination (successful or unsuccessful) was achieved for all network slices with which a given UE seeks registration.

Returning to the present example illustrated in FIGS. 3A and 3B, upon determining that the NSSAA procedure is to be performed for UE 202 with network slice/S-NSSAI 250, AMF 222 initiates an NSSAA procedure with UE 202, as shown at 320, in which the AMF initiates an EAP ID request/response exchange with UE 202 regarding S-NSSAI 130 as shown at 322 and 324 and the remaining operations/ communications/exchanges for the (standards-based) NSSAA procedure 320 are performed at 326, 328, 330, 332 (continuing to FIG. 3B), 334, 336, 338, 340, 342, 344, and 346, as prescribed at least in part by 3GPP TS 23.502 Section 4.2.9.1, TS 33.501, Section 16, and IETF RFC 4187, 5448, and 9048.

Upon a successful completion of the NSSAA procedure for network slice/S-NSSAI 250, AMF 222 can store an indication, as generally shown at 348, that, based on the network slice mapping policies/information 302, UE 202 is considered to also be authenticated for each of network slices/S-NSSAIs 240, 260, and 270, such that an NSSAA procedure for network slices/S-NSSAIs 240, 260, and 270 can be skipped. Thereafter, under an assumption of a successful authentication of UE 202 with network slice/S-NSSAI 250, a standards-based UE Configuration Update procedure is performed between AMF 222 and UE 202, as shown at 350, in which the AMF 222 informs UE 202 of each network slice/S-NSSAI with which UE 101 is allowed/ authorized to establish a PDU session such as, in this example, with each of network slices/S-NSSAI 230 (not subject to NSSAA procedures, in this example), 240, 250, 260, and 270.

However, in another instance if the authentication of UE 202 with network slice/S-NSSAI 250 is unsuccessful, AMF 222, at 348, can perform another NSSAA procedure 320 for another network slice/S-NSSAI identified by UE 202 in the registration request. For instance, the AMF 222 could initiate another NSSAA procedure for network slice/NSSAA procedure 320 for network slice/S-NSSAI 240 and, upon successful authentication of UE 202 with network slice/S-NSSAI 240, the AMF 222 can store an indication that, based on the network slice mapping policies/information 302, UE 202 could also be considered to be authenticated for each of network slices/S-NSSAIs 260, and 270, such that an NSSAA procedure for network slices/S-NSSAIs 260 and 270 could be skipped. Since, in this particular instance, authentication of UE 202 with network slice/S-NSSAI 250 was unsuccessful, the AMF 222 could indicate to UE 202 a rejection of the authentication of network slice/S-NSSAI 250.

Accordingly, techniques illustrated for the example of FIGS. 3A and 3B illustrate a mechanism through which a "grouping" of network slices or mapping policies/information can be provided/configured within a mobile core network for pairing slices for authentication, thereby enabling selective authentication/authorization of network slices such that NSSAA procedures may be skipped for some network slices and also enabling, in some instances, security capabilities for enterprise entities without causing a significant signaling burden.

Figure 4:
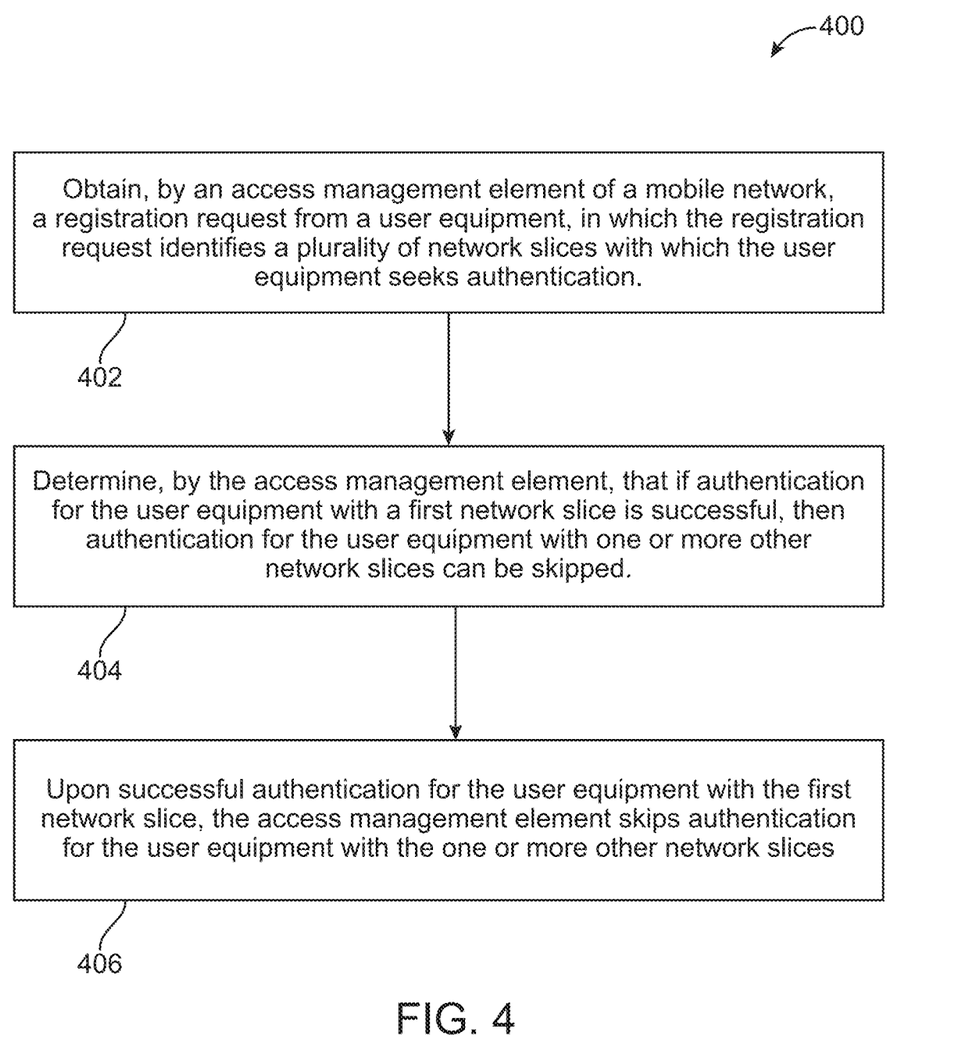
FIG. 4 is a flow chart depicting a method according to an example embodiment.

Referring to FIG. 4, FIG. 4 is a flow chart depicting a method 400 according to an example embodiment. In at least one embodiment, method 400 illustrates example operations that may be performed by an AMF, such as AMF 222, in order to provide selective network slice authentication and authorization, according to an example embodiment.

At 402, the method may include obtaining, by an access management element (e.g., AMF 222) of a mobile network, a registration request from a user equipment, in which the registration request identifies a plurality of network slices with which the user equipment seeks authentication. At 404, the method may include determining, by the access management element, that if authentication for the user equipment with a first network slice is successful, then authentication for the user equipment with one or more other network slices can be skipped. For example, in at least one embodiment, the determining at 404 can be facilitated by network slice mapping policies/information configured for and/or obtained by the access management element (e.g., from a UDM/UDR). At 406, the method may include, upon successful authentication for the user equipment with the first network slice, the access management element skipping authentication for the user equipment with the one or more other network slices.

Accordingly, utilizing techniques provided herein facilitate improvements in enabling selective 5G/nG network slice authentication and authorization procedures, which can reduce the signaling involved for slice authentication when multiple subscribed network slices are enabled for/subject to authentication using NSSAA. Further, such techniques can be used to enable additional security for enterprise use cases without having a signaling burden and/or configuration burden on an enterprise entity.

Figure 5:
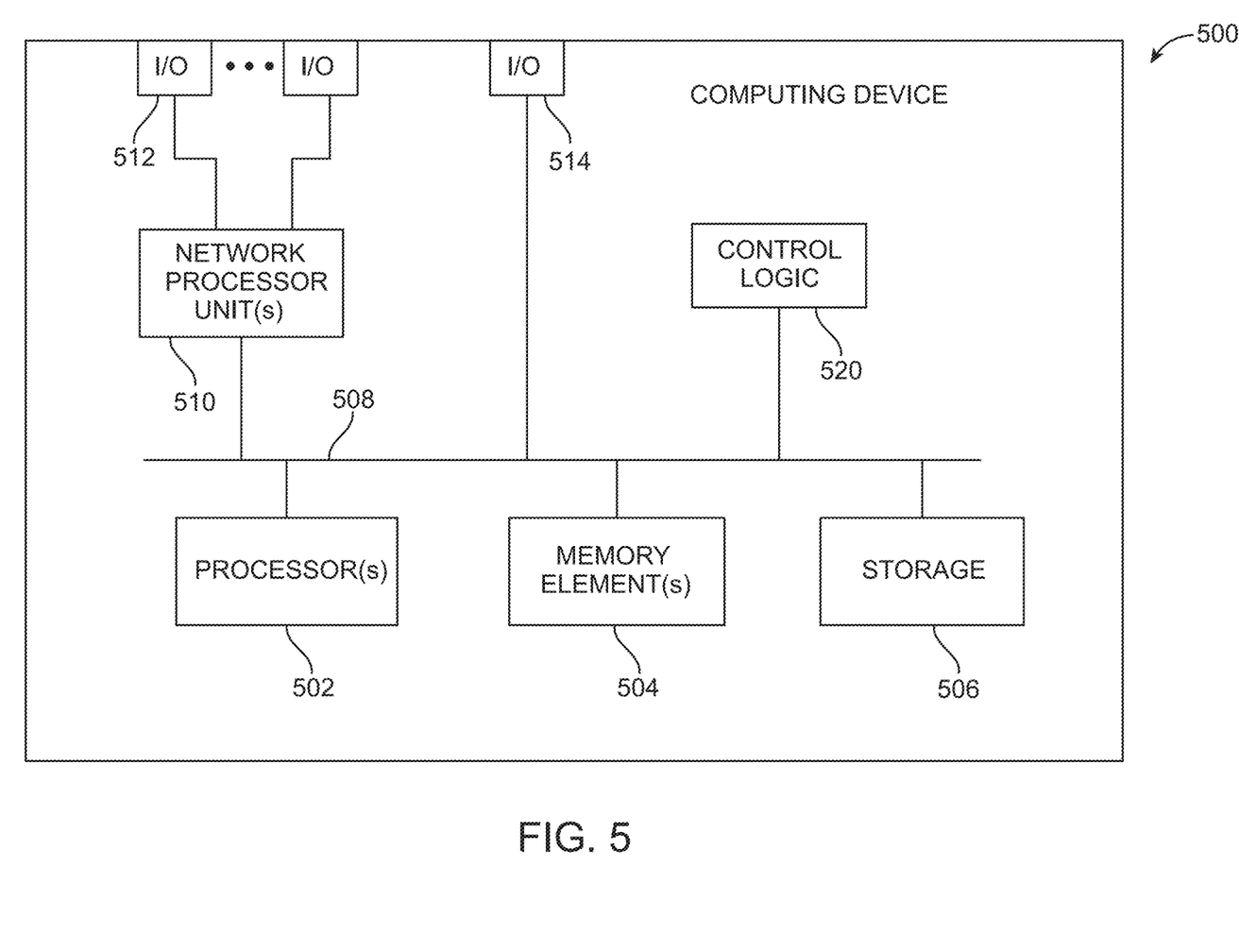
FIG. 5 is a hardware block diagram of a computing device that may perform functions associated with any combination of operations, in connection with the techniques discussed herein.

Referring to FIG. 5, FIG. 5 illustrates a hardware block diagram of a computing device 500 that may perform functions associated with operations discussed herein. In various embodiments, a computing device or apparatus, such as computing device 500 or any combination of computing devices 500, may be configured as any entity/entities as discussed herein in order to perform operations of the various techniques discussed herein, such as, for example, any of AMF 222, NSSAAF 224, UDM 226, AAA 228 and/or any other network element discussed for embodiments herein.

In at least one embodiment, computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communications (wired and/or wireless) between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) and/or antennas/antenna arrays now known or hereafter developed. Thus, the network processor unit(s) 510 and/or network I/O interface(s) 512 may include suitable interfaces for receiving, transmitting, and/or otherwise communicating (in a wired and/or wireless manner) data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one embodiment in which computing device is implemented as at least an access management element, such as AMF 222, the control logic 520 can include instructions that, when executed, cause processor(s) 502 to perform functions including obtaining, a registration request from a user equipment, wherein the registration request identifies a plurality of network slices with which the user equipment seeks authentication; determining that if authentication for the user equipment with a first network slice is successful, authentication for the user equipment with one or more other network slices can be skipped; and upon successful authentication for the user equipment with the first network slice, skipping authentication for the user equipment with the one or more other network slices.

The programs described herein (e.g., control logic 520 of computing device 500) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media encoded with instructions (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 504 of computing device 500) and/or storage (e.g., storage 506 of computing device 500) can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by an access management element of a mobile network, a registration request from a user equipment, wherein the registration request identifies a plurality of network slices with which the user equipment seeks authentication; determining that if authentication for the user equipment with a first network slice is successful, authentication for the user equipment with one or more other network slices can be skipped; and upon successful authentication for the user equipment with the first network slice, skipping authentication for the user equipment with the one or more other network slices.

In one instance the method may further include providing an indication to the user equipment identifying that the user equipment is allowed to establish a session with the first network slice and the one or more other network slices.

In one instance, the determining may include identifying network slice mapping information indicating that if authentication for the first network slice is successful, authentication for the one or more other network slices can be skipped. In one instance, the network slice mapping information indicates different combinations of network slices that, upon successful authentication for a particular network slice, authentication for one or more other particular network slices can be skipped.

In one instance, the determining may include identifying that network slice mapping information for the first network slice indicates the highest number of network slices for which authentication can be skipped as compared to network slice mapping information for the one or more other network slices.

In one instance, the network slice mapping information may indicate different combinations of network slice groups that, upon successful authentication for a particular network slice belonging to one or more particular network slice groups, authentication for one or more other particular network slices belonging to the one or more particular network slice groups can be skipped.

In one instance, the network slice mapping information may be configured for the access management element. In one instance, the access management element may obtain the network slice mapping information from a user data management entity. In one instance, the access management element is a 3GPP Access and Mobility Management Function (AMF).

In one instance, the method may further include, upon unsuccessful authentication for the user equipment with the first network slice, determining, by the access management element, that if authentication for the user equipment with a second network slice is successful, authentication for the user equipment with one or more other network slices can be skipped and providing an indication to the user equipment identifying that the user equipment is allowed to access the second network slice and the one or more other network slices.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', one or more of, 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by an access management element of a mobile network, a registration request from a user equipment, wherein the registration request identifies a plurality of network slices with which the user equipment seeks to register;
   performing, based on the registration request, a primary authentication for the user equipment for mobile network connectivity;
   determining that, based on authentication for the user equipment with a first network slice being successful, authentication for the user equipment with one or more other network slices can be skipped; and
   upon successful authentication for the user equipment with the first network slice, skipping authentication for the user equipment with the one or more other network slices.

2. The method of claim 1, further comprising:
   providing an indication to the user equipment identifying that the user equipment is allowed to establish a session with the first network slice and the one or more other network slices.

3. The method of claim 1, wherein the determining includes:
   identifying network slice mapping information indicating that based on authentication for the first network slice being successful, authentication for the one or more other network slices can be skipped.

4. The method of claim 3, wherein the network slice mapping information indicates different combinations of network slices that, upon successful authentication for a particular network slice, authentication for one or more other particular network slices can be skipped.

5. The method of claim 4, wherein the determining includes:
   identifying that network slice mapping information for the first network slice indicates a highest number of network slices for which authentication can be skipped as compared to network slice mapping information for the one or more other network slices.

6. The method of claim 3, wherein the network slice mapping information indicates different combinations of network slice groups that, upon successful authentication for a particular network slice belonging to one or more particular network slice groups, authentication for one or more other particular network slices belonging to the one or more particular network slice groups can be skipped.

7. The method of claim 3, wherein the network slice mapping information is configured for the access management element.

8. The method of claim 3, wherein the access management element obtains the network slice mapping information from a user data management entity.

9. The method of claim 1, further comprising:
   upon unsuccessful authentication for the user equipment with the first network slice, determining, by the access management element, that based on authentication for the user equipment with a second network slice being successful, authentication for the user equipment with one or more other network slices can be skipped; and
   providing an indication to the user equipment identifying that the user equipment is allowed to access the second network slice and the one or more other network slices.

10. The method of claim 1, wherein the access management element is an Access and Mobility Management Function (AMF).

11. One or more non-transitory computer readable storage media encoded with instructions that, when executed by a processor, cause the processor to perform operations, comprising:
   obtaining, by an access management element of a mobile network, a registration request from a user equipment, wherein the registration request identifies a plurality of network slices with which the user equipment seeks to register;

performing, based on the registration request, a primary authentication for the user equipment for mobile network connectivity;

determining that, based on authentication for the user equipment with a first network slice being successful, authentication for the user equipment with one or more other network slices can be skipped; and upon successful authentication for the user equipment with the first network slice, skipping authentication for the user equipment with the one or more other network slices.

12. The media of claim 11, further comprising instructions that, when executed by the processor, cause the processor to perform further operations, comprising:

providing an indication to the user equipment identifying that the user equipment is allowed to establish a session with the first network slice and the one or more other network slices.

13. The media of claim 11, wherein the determining includes:

identifying network slice mapping information indicating that based on authentication for the first network slice being successful, authentication for the one or more other network slices can be skipped.

14. The media of claim 13, wherein the network slice mapping information indicates different combinations of network slices that, upon successful authentication for a particular network slice, authentication for one or more other particular network slices can be skipped.

15. The media of claim 13, wherein the network slice mapping information indicates different combinations of network slice groups that, upon successful authentication for a particular network slice belonging to one or more particular network slice groups, authentication for one or more other particular network slices belonging to the one or more particular network slice groups can be skipped.

16. An apparatus comprising:

at least one memory element for storing data; and at least one processor for executing instructions associated with the data, wherein executing the instructions causes the apparatus to perform operations, comprising:

obtaining, by an access management element of a mobile network, a registration request from a user equipment, wherein the registration request identifies a plurality of network slices with which the user equipment seeks to register;

performing, based on the registration request, a primary authentication for the user equipment for mobile network connectivity;

determining that based on authentication for the user equipment with a first network slice being successful, authentication for the user equipment with one or more other network slices can be skipped; and upon successful authentication for the user equipment with the first network slice, skipping authentication for the user equipment with the one or more other network slices.

17. The apparatus of claim 16, wherein executing the instructions causes the apparatus to perform further operations, comprising:

providing an indication to the user equipment identifying that the user equipment is allowed to establish a session with the first network slice and the one or more other network slices.

18. The apparatus of claim 16, wherein the determining includes:

identifying network slice mapping information indicating that based on authentication for the first network slice being successful, authentication for the one or more other network slices can be skipped.

19. The apparatus of claim 18, wherein the network slice mapping information indicates different combinations of network slices that, upon successful authentication for a particular network slice, authentication for one or more other particular network slices can be skipped.

20. The apparatus of claim 18, wherein the network slice mapping information indicates different combinations of network slice groups that, upon successful authentication for a particular network slice belonging to one or more particular network slice groups, authentication for one or more other particular network slices belonging to the one or more particular network slice groups can be skipped.

* * * * *